United States Patent
Zhang et al.

(10) Patent No.: US 10,084,894 B2
(45) Date of Patent: Sep. 25, 2018

(54) METHOD, APPARATUS, AND SYSTEM FOR MANAGING TERMINAL DEVICE IN PASSIVE OPTICAL NETWORK

(71) Applicant: HUAWEI TECHNOLOGIES CO., LTD., Shenzhen, Guangdong (CN)

(72) Inventors: Linli Zhang, Xi'an (CN); Wenjun Yao, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/618,776

(22) Filed: Jun. 9, 2017

(65) Prior Publication Data
US 2017/0279941 A1 Sep. 28, 2017

Related U.S. Application Data

(63) Continuation of application No. PCT/CN2015/086640, filed on Aug. 11, 2015.

(30) Foreign Application Priority Data

Dec. 12, 2014 (CN) .......................... 2014 1 0767489

(51) Int. Cl.
*H04B 10/27* (2013.01)
*H04B 10/40* (2013.01)
(Continued)

(52) U.S. Cl.
CPC ........... *H04L 69/324* (2013.01); *H04B 10/27* (2013.01); *H04B 10/40* (2013.01); *H04L 41/00* (2013.01); *H04L 61/6022* (2013.01); *H04L 69/40* (2013.01)

(58) Field of Classification Search
None
See application file for complete search history.

(56) References Cited

U.S. PATENT DOCUMENTS

2007/0230958 A1* 10/2007 Jiang .................. H04B 10/0793
398/72
2009/0041458 A1 2/2009 Lin
(Continued)

FOREIGN PATENT DOCUMENTS

| CN | 101047453 A | 10/2007 |
| CN | 101141309 A | 3/2008 |

(Continued)

OTHER PUBLICATIONS

"Part 3:Carrier Sense Multiple Access with Collision Detection (CSMA/CD) Access Method and Physical Layer Specifications, Amendment: Media Access Control Parameters, Physical Layers, and Management Parameters for Subscriber Access Networks," IEEE Std 802.3ah-2004, IEEE Computer Society, Sep. 7, 2004, 640 pages.

(Continued)

*Primary Examiner* — Darren E Wolf
(74) *Attorney, Agent, or Firm* — Staas & Halsey LLP

(57) ABSTRACT

The present invention provides a method for managing a terminal device in a PON network. When a layer 3 network between an OLT and an ONU is disconnected, a layer 2 channel is established between the OLT and the ONU by extending an OAM protocol, and the ONU is managed by using the layer 2 channel. In this way, maintenance personnel do not need to go to a site to perform commissioning, and therefore, maintenance costs can be reduced.

10 Claims, 3 Drawing Sheets

An OLT sends a first OAM packet to an ONU, where the sent first OAM packet carries a channel establishment command identifier — S200

The ONU sends a second OAM packet to the OLT, where the second OAM packet carries a command identifier indicating that a channel is successfully established — S210

The OLT sends a management instruction for managing the ONU to the ONU by using the layer 2 channel — S220

(51) Int. Cl.
*H04L 29/08* (2006.01)
*H04L 12/24* (2006.01)
*H04L 29/12* (2006.01)
*H04L 29/14* (2006.01)

(56) References Cited

U.S. PATENT DOCUMENTS

| | | | |
|---|---|---|---|
| 2009/0142059 A1* | 6/2009 | Chen | H04J 14/0227 398/58 |
| 2012/0134677 A1 | 5/2012 | Xiong et al. | |
| 2013/0129354 A1 | 5/2013 | Tanaka et al. | |

FOREIGN PATENT DOCUMENTS

| | | |
|---|---|---|
| CN | 102148748 A | 8/2011 |
| CN | 102882717 A | 1/2013 |
| CN | 103701956 A | 4/2014 |
| JP | 2002141913 A | 5/2002 |
| JP | 2004134970 A | 4/2004 |
| JP | 2013175835 A | 9/2013 |
| JP | 2013546240 A | 12/2013 |
| WO | 2012090323 A1 | 7/2012 |

OTHER PUBLICATIONS

"Series G: Transmission Systems and Media, Digital Systems and Networks, Digital sections and digital line system—Optical line systems for local and access networks," ITU-T G.984.3, Feb. 2004, 114 pages, XP002374420.
International Search Report dated Oct. 29, 2015 in corresponding International Patent Application No. PCT/CN2015/086640.
Extended European Search Report dated Jan. 3, 2017 in corresponding European Patent Application No. 15867624.7.
European Decision on Grant dated Apr. 24, 2017 in corresponding European Patent Application No. 15867624.7.
Chinese Search Report dated Apr. 22, 2018 in corresponding Chinese Patent Application No. 201410767489.5.
Chinese Office Action dated May 2, 2018 in corresponding Chinese Patent Application No. 201410767489.5.
International Search Report dated Oct. 29, 2015 in corresponding International Application No. PCT/CN2015/086640.
Notice of Reasons for Rejection, dated Jun. 25, 2018, in Japanese Application No. 2017531581 (7 pages).

* cited by examiner

| Field | Filled content | Description | Length |
|---|---|---|---|
| DMAC | 01-80-C2-00-00-02 | MAC address of a destination node | 6 byte |
| SMAC | | Bridge MAC of a sending device | 6 byte |
| Type | 0x8809 | Ethernet type, 0x8809 identifier slow protocols | 2 byte |
| subtype | | Subtype, reserved value of IEEE | 1 byte |
| Packet content | | Private packet content | |
| FCS | Frame check sequence | FCS | |

FIG. 3

| Field | Filled content | Description | Length |
|---|---|---|---|
| flag | 0x0000FFFE | Extended protocol identifier | 4 byte |
| Version | | Extended protocol version number | 1 byte |
| code | 0x8 | Message type | 1 byte |
| Data/pad | | Extended protocol packet content | Use TLV format |

FIG. 4

METHOD, APPARATUS, AND SYSTEM FOR MANAGING TERMINAL DEVICE IN PASSIVE OPTICAL NETWORK

CROSS-REFERENCE TO RELATED APPLICATIONS

This application is a continuation of International Application No. PCT/CN2015/086640, filed on Aug. 11, 2015. The International Application claims priority to Chinese Patent Application No. 201410767489.5, filed on Dec. 12, 2014. The afore-mentioned patent applications are hereby incorporated by reference in their entireties.

TECHNICAL FIELD

The present invention relates to a PON (Passive Optical Network, passive optical network), and in particular, to a method, an apparatus, and a system for managing a terminal device in a PON.

BACKGROUND

In a current PON, management of an ONU (Optical Network Unit, optical network unit) is implemented by using an OLT (Optical Line Terminal, optical line terminal). In a live network, a typical manner is to manage the ONU on the OLT by using a layer 3 protocol, for example, to manage the ONU by using the Telnet or SNMP protocol based on layer 3. In this manner, if a layer 3 network is disconnected, the OLT cannot manage the ONU, software commissioning maintenance personnel need to go to a site to resolve a hosting problem, and maintenance costs are very high.

SUMMARY

An embodiment of the present invention provides a method for managing a terminal device in a passive optical network, where the passive optical network includes an optical line terminal OLT and an optical network unit ONU, the OLT is connected to the ONU by using a Gigabit Ethernet, and the method includes:
  establishing, by the OLT, a channel that is based on a layer 2 network protocol and that is between the OLT and the ONU; and
  sending, by the OLT by using the channel, a management instruction for managing the ONU to the ONU, where
the establishing, by the OLT, a channel that is based on a layer 2 network protocol includes:
  sending, by the OLT, a first operation, administration and maintenance OAM packet based on an Ethernet protocol to the ONU, where the first OAM packet carries a channel establishment command identifier; and
  receiving, by the OLT, a second OAM packet of the ONU, where the second OAM packet carries a command identifier indicating that the channel is successfully established.

An embodiment of the present invention provides an optical line terminal OLT, including:
  an optical transceiver, connected to an optical network unit ONU by using a Gigabit Ethernet, and configured to establish a channel that is based on a layer 2 network protocol, the optical transceiver is specifically configured to:
send a first operation, administration and maintenance OAM packet based on an Ethernet protocol to the ONU, where the first OAM packet carries a channel establishment command identifier, and receive a second OAM packet of the ONU, where the second OAM packet carries a command identifier indicating that a channel is successfully established; and
  a processor, configured to instruct the optical transceiver to send, by using the channel, a management instruction for managing the ONU to the ONU.

An embodiment of the present invention provides an optical network unit ONU, including:
  an optical transceiver, connected to an optical line terminal OLT by using a Gigabit Ethernet, and configured to: receive a first operation, administration and maintenance OAM packet based on an Ethernet protocol from the OLT, where the first OAM packet carries a channel establishment command identifier; and send a second OAM packet to the OLT, where the second OAM packet carries a command identifier indicating that a channel is successfully established; and
  a processor, configured to receive a management instruction from the OLT by using the established channel, and perform configuration according to the management instruction.

In the method and the apparatus for managing a terminal device provided in the embodiments, a channel based on a layer 2 protocol is established between an OLT and an ONU, and when a fault occurs in a layer 3 connection between the OLT and the ONU, the OLT may send a management instruction for managing the ONU to the ONU by using the layer 2 channel. In this way, maintenance personnel do not need to go to a site to perform commissioning, and therefore, maintenance costs can be reduced.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

FIG. 3 is a schematic structural diagram of an extended OAM packet according to an embodiment of the present invention;

FIG. 4 is a schematic diagram of a structure of a packet showing a message type according to an embodiment of the present invention;

DESCRIPTION OF EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
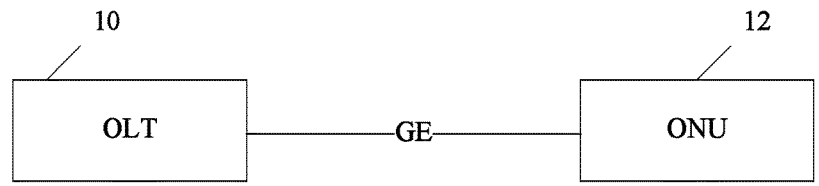
FIG. 1 is an architecture diagram of a system according to an embodiment of the present invention.

An embodiment of the present invention provides a PON, as shown in FIG. 1, including an OLT 10 and an ONU 12, where the OLT 10 is connected to the ONU 12 by using a GE (Gigabit Ethernet, Gigabit Ethernet).

In FIG. 1, when a layer 3 network between the OLT 10 and the ONU 12 is disconnected, a channel based on a layer 2 network protocol (layer 2 channel for short) may be established between the OLT 10 and the ONU 12, to manage the ONU 12 by using the channel. The establishment of the layer 2 channel may be implemented by extending existing Ethernet OAM (Operation, Administration and Maintenance, operation, administration and maintenance) to carry information required for establishing the channel. After receiving the information, the ONU 12 returns a success response message to the OLT 10 to indicate that the channel is established. The success response message sent by the ONU 12 may be an extended OAM packet.

After the layer 2 channel is established, the OLT 10 may send a management instruction for managing the ONU 12 to the ONU 12 by using the layer 2 channel. A sending manner may be carrying such management instruction in a manner of extending an OAM packet. After receiving the management instructions, the ONU 12 may perform configuration by using the management instruction.

Figure 2:
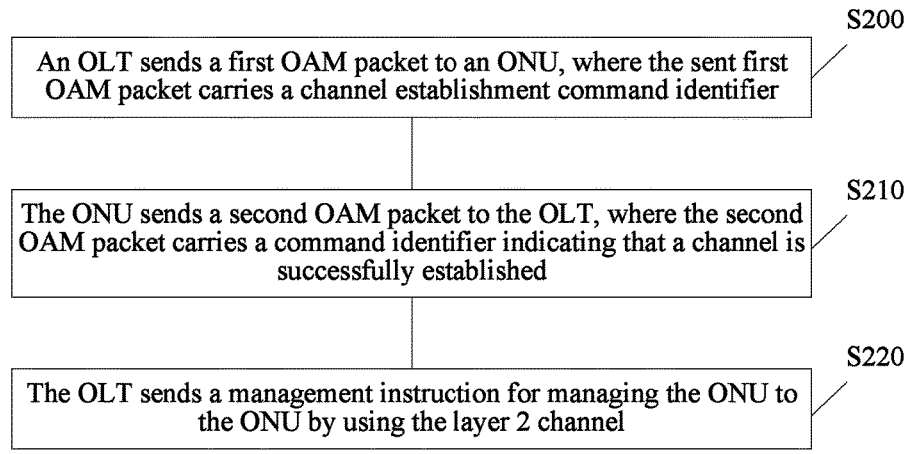
FIG. 2 is a flowchart of a method according to an embodiment of the present invention.

Specifically, based on the architecture in FIG. 1, a method process in which an OLT manages an ONU is shown in FIG. 2, including:

S200: An OLT sends a first OAM packet to an ONU, where the sent first OAM packet carries a channel establishment command identifier.

In this embodiment, an existing OAM packet needs to be extended to establish a layer 2 channel, and a corresponding identifier is used, so that the ONU identifies the OAM packet as a channel establishment packet. The existing OAM packet is shown in FIG. 3, where "subtype" is a reserved field, and the field needs to be extended in this embodiment, so that the field carries a specific message type of the OAM packet. A format of the carried message type is shown in FIG. 4. In FIG. 4, a "Data/pad" field carries a TLV (Type-Length-Value, type-length-value) of the specific message type. Each message type corresponds to a type of TLV, different TLVs are identified by using different types, as shown in the following table:

TABLE 1

| TYPE | Description |
| --- | --- |
| 0x01 | Channel connection establishment message |
| 0x02 | Channel connection response message |
| 0x03 | Instruction message |
| 0x04 | Instruction report message |
| 0x05 | Channel connection release massage |
| 0x08-0xFF | Reserved |

In the step, in the first OAM packet sent by the OLT to the ONU, the message type carried in the "subtype" field is shown in FIG. 4, where a "Data/pad" field carries a TLV whose type is "0x01".

S210: The ONU sends a second OAM packet to the OLT, where the second OAM packet carries a command identifier indicating that a channel is successfully established.

The ONU receives the first OAM packet, and identifies, according to a value of the "Data/pad" field, that the first OAM packet is used for negotiating establishment of a layer 2 channel; therefore, the ONU acquires an SMAC (Source Media Access Control, source MAC) address from the first OAM packet, and uses the SMAC address as identification information for identifying the layer 2 channel.

The ONU sends the second OAM packet to the OLT. The second OAM packet has a same packet format as the first OAM, and carries a command identifier indicating that the channel is successfully established, where a "Data/pad" field carries a TLV whose type is "0x02", which indicates that the layer 2 channel is successfully established.

S220: The OLT sends a management instruction for managing the ONU to the ONU by using the layer 2 channel.

After receiving the second OAM packet, the OLT may know, according to the command identifier indicating that the channel is successfully established in the second OAM packet, that the layer 2 channel is successfully established, and send a management instruction for managing the ONU to the ONU by using the layer 2 channel.

On the OLT, numbers of a subrack, a slot, and a port on the OLT that are connected to the ONU may be used as identification information of the layer 2 channel, and a correspondence between a MAC address of the ONU and the identification information of the layer 2 channel is established. The corresponding identification information of the layer 2 channel may be found according to the MAC address of the ONU, so that the management instruction for managing the ONU may be sent to the ONU by using the found layer 2 channel.

A manner used by the OLT to send the management instruction to the ONU may be sending a third OAM packet to the ONU. The third OAM packet is extended in a manner similar to that of the first OAM packet, where a Data/pad" field carries a TLV whose type is "0x03", and a value field of the TLV carries a specific management instruction. After receiving the third OAM packet, the ONU extracts the specific management instruction, and performs configuration according to the management instruction.

Optionally, after completing configuration according to the management instruction, the ONU may further return, by using the layer 2 channel, a configuration completion response message to the OLT. A manner for sending the response message may be extending the OAM packet.

Optionally, the OLT may further encrypt the layer 2 channel, and in order that the ONU can correctly decrypt a packet received on the layer 2 channel, the OLT may send a key to the ONU by using the layer 2 channel. A sending manner may be similar to that of the first OAM packet, where a Data/pad" field carries a TLV whose type is "0x03", and a value field of the TLV carries the key. In another embodiment, the key may be carried in the first OAM packet and sent to the ONU.

In the method for managing a terminal device provided in this embodiment, a channel based on a layer 2 protocol is established between an OLT and an ONU, and when a fault occurs in a layer 3 connection between the OLT and the ONU, the OLT may send a management instruction for managing the ONU to the ONU by using the layer 2 channel. In this way, maintenance personnel do not need to go to a site to perform commissioning, and therefore, maintenance costs can be reduced.

Figure 5:
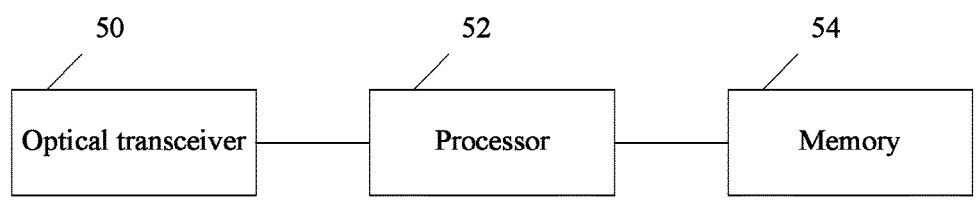
FIG. 5 is a schematic diagram of a structure of an OLT according to an embodiment of the present invention.

An embodiment of the present invention provides an OLT. As shown in FIG. 5, the OLT includes an optical transceiver 50 and a processor 52. The optical transceiver 50 is configured to connect to an ONU by using a GE, and the optical transceiver 50 may be an optical module and the like. The processor 52 may be a CPU, a microprocessor, or the like. The processor 52 may be integrated in the optical transceiver 50, or may be independent of the optical transceiver 50 and connected to the optical transceiver 50 by using a logic circuit, a bus, or the like.

The optical transceiver 50 is connected to the optical network unit ONU by using the GE, and is configured to establish a channel that is based on a layer 2 network protocol, the optical transceiver is specifically configured to: send a first OAM packet based on an Ethernet protocol to the ONU, where the first OAM packet carries a channel establishment command identifier, and receive a second OAM packet of the ONU, where the second OAM packet carries command identifier indicating that a channel is successfully established.

The processor 52 is configured to instruct the optical transceiver 50 to send, by using the channel, a management instruction for managing the ONU to the ONU.

For a specific process in which the optical transceiver 50 sends the first OAM packet, refer to the description of the foregoing embodiment. A process in which the processor 52 instructs the optical transceiver 50 to send the management instruction to the ONU may be that the management instruction is sent to the ONU by using an extended OAM packet: a third OAM packet. A specific method for sending the management instruction to the ONU by using the established channel is specifically described in the foregoing embodiment.

The OLT provided in this embodiment further includes a memory 54, which may be configured to store identification information of the established channel, for example, numbers of a subrack, a slot, and a port that are on the OLT, and store a correspondence between the identification information of the channel and a MAC address of the ONU. Therefore, when finding the channel, the processor 52 may find a corresponding identifier according to the MAC address of the ONU and further find a corresponding channel.

In the OLT provided in this embodiment, a channel based on a layer 2 protocol is established between the OLT and an ONU, and when a faulty occurs in a layer 3 connection between the OLT and the ONU, the OLT may send a management instruction for managing the ONU to the ONU by using the layer 2 channel. In this way, maintenance personnel do not need to go to a site to perform commissioning, and therefore, maintenance costs can be reduced.

Figure 6:
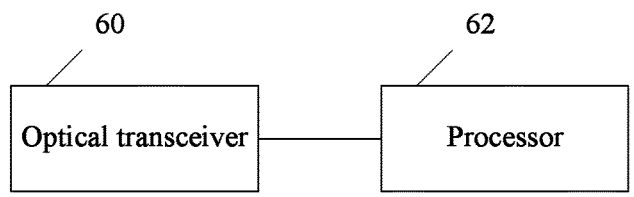
FIG. 6 is a schematic diagram of a structure of an ONU according to an embodiment of the present invention.

An embodiment of the present invention provides an ONU. As shown in FIG. 6, the ONU includes an optical transceiver 60 and a processor 62. The optical transceiver 60 is configured to connect to an OLT by using a GE, and the optical transceiver 60 may be an optical module and the like. The processor 62 may be a CPU, a microprocessor, or the like. The processor 62 may be integrated in the optical transceiver 60, or may be independent of the optical transceiver 60 and connected to the optical transceiver 60 by using a logic circuit, a bus, or the like.

The optical transceiver 60 is configured to receive a first OAM packet based on an Ethernet protocol from the OLT, where the first OAM packet carries a channel establishment command identifier, and send a second OAM packet to the OLT, where the second OAM packet carries a command identifier indicating that a channel is successfully established.

The processor 62 is configured to receive a management instruction from the OLT by using the established channel, and perform configuration according to the management instruction.

Specifically, the receiving, by the processor 62, the management instruction of the OLT by using the channel may be receiving a third OAM packet of the OLT, where the third OAM packet carries the management instruction in a manner of extension. After acquiring such management instructions, the processor 62 may perform configuration according to the management instructions.

In the ONU provided in this embodiment, a channel based on a layer 2 protocol is established between an OLT and the ONU, and when a fault occurs in a layer 3 connection between the OLT and the ONU, the OLT may send a management instruction for managing the ONU to the ONU by using the layer 2 channel. In this way, maintenance personnel do not need to go to a site to perform commissioning, and therefore, maintenance costs can be reduced.

A person of ordinary skill in the art may understand that all or some of the steps of the methods in the embodiments may be implemented by a program instructing relevant hardware. The program may be stored in a computer-readable storage medium, such as a ROM/RAM, a magnetic disk, or an optical disc.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for managing a terminal device in a passive optical network, wherein the passive optical network comprises an optical line terminal (OLT) and an optical network unit (ONU), the OLT is connected to the ONU by using a Gigabit Ethernet, and the method comprises:
   establishing, by the OLT, a channel that is based on a layer 2 network protocol and that is between the OLT and the ONU; and
   sending, by the OLT by using the channel, a management instruction for managing the ONU to the ONU, wherein
   the establishing, by the OLT, a channel that is based on a layer 2 network protocol comprises:
   sending, by the OLT, a first operation, administration and maintenance (OAM) packet based on an Ethernet protocol to the ONU, wherein the first OAM packet carries a channel establishment command identifier; and
   receiving, by the OLT, a second OAM packet of the ONU, wherein the second OAM packet carries a command identifier indicating that the channel is successfully established.

2. The method according to claim 1, wherein the sending, by the OLT by using the channel, a management instruction for managing the ONU to the ONU specifically comprises:
   finding a corresponding channel identifier by using a Media Access Control (MAC) address identifier of the ONU; and
   sending the management instruction to the ONU by using a channel corresponding to the channel identifier.

3. The method according to claim 2, wherein the channel identifier comprises a combination of numbers of a subrack, a slot, and a port that are on the OLT.

4. The method according to claim 1, wherein the sending, by the OLT by using the channel, a management instruction for managing the ONU to the ONU specifically comprises:
   sending, by the OLT, a third OAM packet to the ONU by using the channel, wherein the third OAM packet carries the management instruction.

5. The method according to claim 1, wherein the method further comprises:
   sending, by the OLT, a key to the ONU by using the channel, wherein the key is used by the ONU to decrypt an OAM packet received.

6. An optical line terminal (OLT), comprising:
   an optical transceiver, connected to an optical network unit (ONU) by using a Gigabit Ethernet, and configured to establish a channel that is based on a layer 2 network protocol, the optical transceiver is specifically configured to: send a first operation, administration and maintenance (OAM) packet based on an Ethernet protocol to the ONU, wherein the first OAM packet carries a channel establishment command identifier, and receive a second OAM packet of the ONU, wherein the second OAM packet carries a command identifier indicating that the channel is successfully established; and
   a processor, configured to instruct the optical transceiver to send, by using the channel, a management instruction for managing the ONU to the ONU.

7. The OLT according to claim 6, comprising a memory, configured to store a correspondence between a Media Access Control (MAC) address of the ONU and an identifier of the channel, wherein the processor is further configured to find the identifier of the channel in the memory by using the MAC address of the ONU.

8. An optical network unit (ONU), comprising:
   an optical transceiver, connected to an optical line terminal (OLT) by using a Gigabit Ethernet, and configured to: receive a first operation, administration and maintenance (OAM) packet based on an Ethernet protocol from the OLT, wherein the first OAM packet carries a channel establishment command identifier; and send a second OAM packet to the OLT, wherein the second OAM packet carries a command identifier indicating that a channel is successfully established; and
   a processor, configured to receive a management instruction from the OLT by using the established channel, and perform configuration according to the management instruction.

9. The ONU according to claim 8, wherein the processor is specifically configured to receive a third OAM packet by using the channel, wherein the third OAM packet carries the management instruction.

10. A passive optical network, comprising an OLT and at least one ONU, wherein the OLT and the ONU are connected by using a Gigabit Ethernet,
   wherein the OLT is configured to: establish a channel that is based on a layer 2 network protocol, and send a first operation, administration and maintenance (OAM) packet based on an Ethernet protocol to the ONU, wherein the first OAM packet carries a channel establishment command identifier, and receive a second OAM packet of the ONU, wherein the second OAM packet carries a command identifier indicating that the channel is successfully established; and instruct the optical transceiver to send, by using the channel, a management instruction for managing the ONU to the ONU;
   wherein the ONU is configured to: receive a first operation, administration and maintenance (OAM) packet based on an Ethernet protocol from the OLT, wherein the first OAM packet carries a channel establishment command identifier; and send a second OAM packet to the OLT, wherein the second OAM packet carries a command identifier indicating that a channel is successfully established; and receive a management instruction from the OLT by using the established channel, and perform configuration according to the management instruction.

\* \* \* \* \*